H. B. SIMONS.
TRACTION COUPLING OR HITCH.
APPLICATION FILED DEC. 30, 1918.

1,296,563.

Patented Mar. 4, 1919.

WITNESSES
Howard D. Orr
H. T. Chapman

H. B. Simons, INVENTOR,
BY E. G. Siggers
ATTORNEY

UNITED STATES PATENT OFFICE.

HARRY B. SIMONS, OF MONTESANO, WASHINGTON.

TRACTION COUPLING OR HITCH.

1,296,563.   Specification of Letters Patent.   Patented Mar. 4, 1919.

Application filed December 30, 1918. Serial No. 268,931.

*To all whom it may concern:*

Be it known that I, HARRY B. SIMONS, a citizen of the United States, residing at Montesano, in the county of Grays Harbor and State of Washington, have invented a new and useful Traction Coupling or Hitch, of which the following is a specification.

This invention has reference to traction couplings or hitches, and its object is to provide means whereby a trailer or other article may be connected to a motor vehicle, the invention being particularly useful where logs or other heavy materials are to be transported.

In accordance with the invention, the strain between the rear axle of the motor vehicle and the rear frame of the truck is equalized, thereby avoiding overstrain on either the axle or frame as occurs when the trailer is attached to one or the other. The invention is useful in causing the trailer to track to far better effect than is customary. The invention is useful in reducing the shock or jar to both the trailer and motor vehicle by which the trailer is drawn. The invention is useful particularly in hauling lengthy articles, which rest on both the motor vehicle and the trailer, in that it gives elasticity to the combined conveyance and prevents shortening of the distance between the points where the lengthy object being conveyed contacts with the forward and rearward conveyances respectively, on making turns.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figures 1, 2:
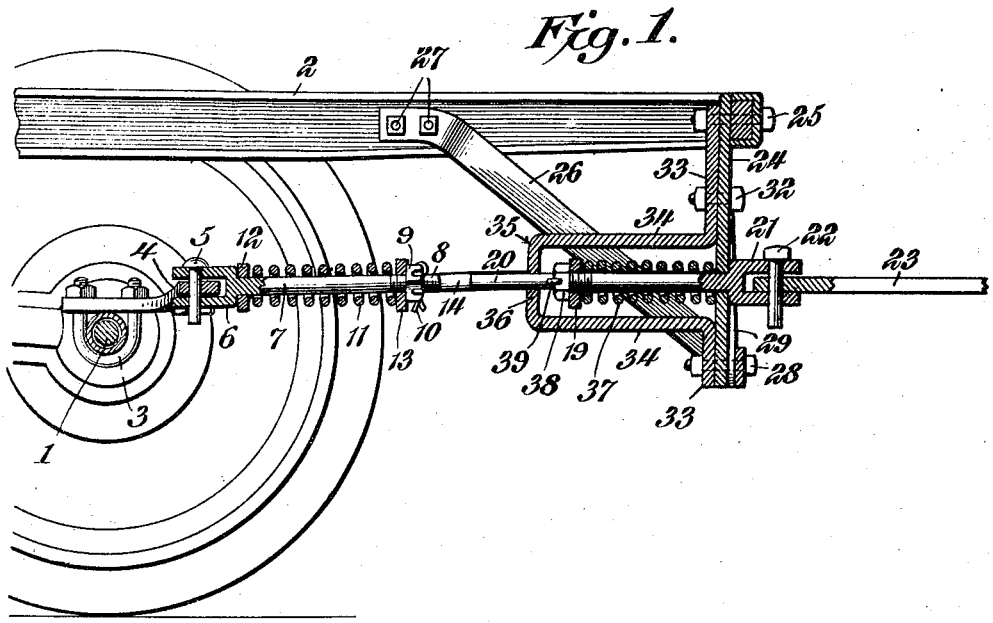
Figure 1 is a longitudinal vertical section through a small portion of the rear part of a motor vehicle.
Fig. 2 is a plan view of the structure shown in Fig. 1, but illustrating the chassis frame in dotted lines.

Referring to the drawing, there is shown a motor vehicle A, the showing being only sufficient to indicate a motor vehicle and the only part of the vehicle to which special reference is had is the rear axle 1 and the chassis frame 2 which may be, as is customary, of channel steel.

Applied to the axle 1 by means of U-bolts 3, or by other fastening devices, is a yoke 4 which may be in the form of a bar of flat material with relatively short legs and the intermediate part of the bar may be bent somewhat out of the plane of the legs, as best shown in Fig. 1, although its particular bending is not obligatory.

Pivoted to the yoke 4 about midway of its length by means of a pivot pin or bolt 5, is a bifurcated head 6 formed on one end of a rod 7, the other end being suitably threaded, as indicated at 8, to receive a nut 9, the latter being preferably a castle nut so that it may be secured to the bolt by means of a cotter pin 10.

The pin 5 preferably traverses the yoke 4 near that side thereof toward the axle 1, thus greatly strengthening the connection because of the increased width of material against which the pin engages.

The rod 7 is surrounded by a spring 11 lodged between two plates 12 and 13 respectively, and against which the ends of the spring bear. The plate 12 engages against the bifurcated end 6 and the plate 13 bears against the nut 9 so that the expansion of the spring 11 is limited thereby.

Traversing the corresponding outer ends of the plates 12 and 13 are other rods 14, 15 respectively, each formed at one end with a head 16, and at the other end each rod is threaded, as shown at 17, to receive nuts 18, one nut of each pair serving as a lock nut, although castle nuts like the nut 9 may be used.

The rods 14 and 15 extend for a considerable distance beyond the plate 13 in a direction remote from the plate 12 and at the threaded ends 17 traverse the corresponding ends of another plate 19 similar to the plates 12 and 13. About midway of the length of the plate 19 it is also traversed by a rod 20 extending in substantially the same direction as the rod 7 and at the end remote from the rod 7 this rod 20 has a bifurcated head 21 similar to the head 6. The head 21 is traversed by a bolt or pin 22 connecting a link 23 to the head 21. The link 23 is continued to and connects with the trailer and may form a part thereof, wherefore, the link 23 is to be taken as indicative of any suitable trailer without more extended illustration of the trailer. Ordinarily a trailer truck comprises a body portion and one or more sets of wheels and as this invention has nothing whatever in itself to do with the specific form of the trailer, it is neither shown nor described further than the showing of the link 23.

The rod 20 also traverses a hanger 24 in the form of a bar fast at one end to and depending from the rear cross-piece of the chassis frame 2 to which it is secured by bolts 25. The lower end of the hanger 24 is connected to the side members of the chassis frame 2 by braces 26 connected to the frame 2 by bolts 27 and to the lower end of the depending hanger 24 by bolts 28.

Connecting the lower end of the hanger and the rear member of the chassis 2 are braces 29, the bolts 28 serving the double purpose of holding the corresponding ends of the braces 26 and 29 to the hanger, and other bolts 30 connecting the braces 29 to the end cross member of the chassis frame.

Secured to the hanger 24 by the bolts 28 and other bolts 32 are angle extensions 33 of the leg portions 34 of a bracket 35, having a connecting or yoke portion 36 traversed by the rod 20. Between the hanger 24 and the plate 19 the rod 20 is surrounded by a spring 37 and the plate 19 may be held at a determined place on the rod 20 by a castle nut 38 secured in place by a cotter pin 39.

Where the automobile is to be used from time to time for hauling the trailer the coupling may remain fast to the chassis 2 and axle 1, the trailer being disconnected by removal of the pin 22. When the trailer is being drawn by the automobile the load is upon the rod 20 and is resisted by the hanger 24 and braces 26 and 29 connected to the chassis frame. Moreover, the load is further distributed through the spring 37 to the plate 19, thence through the rods 14 and 15 to the plate 12, and then by way of the spring 11 to the plate 13, nut 9, rod 7 and yoke 4 to the axle 1. There are therefore provided two elastic or yieldable connections between the motor vehicle represented by the automobile A and the trailer represented by the link 23, part of the load passing to the axle 1 of the motor vehicle through the springs 11 and 37 in tandem and part through the spring 37 to the hanger 24, and thence to the chassis frame 2 by way of the braces 26 and 29 as well as by the hanger 24.

What is claimed is:—

1. A traction coupling or hitch for connecting a trailer or load to a motor vehicle to be drawn by the latter, comprising devices connected to the rear axle of the motor vehicle, and other devices connected to the chassis frame of the motor vehicle, said connections each including a spring, whereby the load is elastically distributed to the axle and chassis frame of the motor vehicle.

2. A traction coupling or hitch for connecting a trailer or load to a motor vehicle to be drawn by the latter, comprising a spring device connected at the forward end to the rear axle of the vehicle, and another spring device having means at the rear end for connecting the load to it, the second-named spring device being in turn connected to the chassis of the vehicle and the two spring devices being also connected together.

3. A traction coupling or hitch for connecting a trailer or load to a motor vehicle to be drawn by the latter, comprising two spring devices connected in tandem with one spring device connected to the rear axle of the vehicle and the other spring device having means connecting the load to it, and connections between the second spring device and the chassis of the vehicle.

4. A traction coupling or hitch for connecting a trailer or load to a motor vehicle to be drawn by the latter, comprising a spring device connected to the rear axle of the vehicle and yieldable to the rear, and another spring device carried by the chassis of the vehicle and yieldable to the rear, said second spring device having means for connecting the load to it, and connections between the two spring devices.

5. A traction coupling or hitch for connecting a trailer or load to a motor vehicle to be drawn by the latter, comprising a rod, connections between the rod and the rear axle of the vehicle, a spring on the rod yieldable toward the rear, slidable plates on the rod at the ends of the spring, another rod with means at the rear end for connecting the load thereto, a plate on the second rod, other rods traversing the plates on the first-named rods, a hanger depending from the chassis of the vehicle and carrying the second-named rod, and a spring on the second-named rod between the plate thereon and the hanger.

In testimony that I claim the foregoing as my own I have hereto affixed my signature.

HARRY B. SIMONS.

Witnesses:
J. A. HUTCHESON,
G. W. FOSS.